United States Patent
Reed

(10) Patent No.: US 10,493,966 B2
(45) Date of Patent: Dec. 3, 2019

(54) ROAD SURFACE TRACTION SYSTEM

(71) Applicant: Ford Global Technologies, LLC, Dearborn, MI (US)

(72) Inventor: Glenn Richard Reed, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 244 days.

(21) Appl. No.: 15/667,350

(22) Filed: Aug. 2, 2017

(65) Prior Publication Data
US 2019/0039584 A1 Feb. 7, 2019

(51) Int. Cl.
| | |
|---|---|
| *B60R 22/00* | (2006.01) |
| *B60T 8/56* | (2006.01) |
| *B60T 8/48* | (2006.01) |
| *B60T 17/18* | (2006.01) |
| *B60T 1/14* | (2006.01) |
| *B60B 39/02* | (2006.01) |
| *B60B 39/04* | (2006.01) |
| *B60T 1/04* | (2006.01) |
| *B60B 39/12* | (2006.01) |
| *B60T 8/32* | (2006.01) |

(52) U.S. Cl.
CPC .............. *B60T 8/56* (2013.01); *B60B 39/02* (2013.01); *B60B 39/04* (2013.01); *B60B 39/12* (2013.01); *B60T 1/04* (2013.01); *B60T 1/14* (2013.01); *B60T 8/4809* (2013.01); *B60T 17/18* (2013.01); *B60T 8/3205* (2013.01); *B60T 2210/12* (2013.01)

(58) Field of Classification Search
CPC ........ B60W 30/09; B60W 10/18; B60Q 1/525
See application file for complete search history.

(56) References Cited

U.S. PATENT DOCUMENTS

| | | | |
|---|---|---|---|
| 5,580,106 A | 12/1996 | Dulberg et al. | |
| 7,512,487 B1 * | 3/2009 | Golding | G01C 21/3484 701/424 |
| 9,288,449 B2 * | 3/2016 | Gans | H04N 7/181 |

FOREIGN PATENT DOCUMENTS

| | | |
|---|---|---|
| CN | 2858404 Y | 1/2007 |
| DE | 102009020657 A1 | 11/2010 |
| DE | 102011104936 A1 | 4/2012 |
| EP | 2377692 A1 | 10/2011 |
| EP | 2535205 A1 | 12/2012 |
| WO | WO 2007056834 A1 | 5/2007 |

\* cited by examiner

*Primary Examiner* — Adam M Alharbi
(74) *Attorney, Agent, or Firm* — Frank Lollo; Eversheds Sutherland (US) LLP

(57) ABSTRACT

A vehicle is disclosed for providing increased friction between the wheels of a vehicle and the ground. An example vehicle includes an anti-lock brake system, inertial sensor, and wheels. The vehicle also includes a computing system configured to deploy aggregate to an area proximate the wheels, responsive to determining that a vehicle traction value is below a first threshold. The computing system is also configured to, after deploying the aggregate, deploy a friction mat to an area proximate the wheels, responsive to determining that the vehicle traction value remains below a second threshold.

20 Claims, 4 Drawing Sheets

ROAD SURFACE TRACTION SYSTEM

TECHNICAL FIELD

The present disclosure generally relates to vehicle traction, and, more specifically, systems, methods, and devices for increasing traction between wheels and a road surface upon determining that the vehicle has lost traction.

BACKGROUND

Modern vehicles may include various electrical systems and devices for use by the vehicle and/or occupants. These systems may include safety devices (seatbelts, anti-lock brake systems, airbags, etc.) as well as devices that improve driver and passenger comfort.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicles that may detect a loss of traction, and responsively apply one or more measures to increase vehicle traction and provide additional safety for the driver and any passengers. An example disclosed vehicle includes an automatic brake system, inertial sensor, and wheels. The vehicle also includes a computing system configured to deploy aggregate to an area proximate the wheels, responsive to determining that a vehicle traction value is below a first threshold. And the computing system is also configured to, after deploying the aggregate and responsive to determining that the vehicle traction value remains below a second threshold, deploy a friction mat to an area proximate the wheels.

An example disclosed method includes determining that a vehicle traction value is below a first threshold, wherein the vehicle comprises an automatic brake system, an inertial sensor, and wheels. The method also includes responsively deploying aggregate to an area proximate the wheels. The method further includes after deploying the aggregate and responsive to determining that the vehicle traction value remains below a second threshold, deploying a friction mat to an area proximate the wheels.

A third example may include means for determining that a vehicle traction value is below a first threshold, wherein the vehicle comprises an automatic brake system, an inertial sensor, and wheels. The example may also include means for responsively deploying aggregate to an area proximate the wheels. The example may further include, after deploying the aggregate and responsive to determining that the vehicle traction value remains below a second threshold, means for deploying a friction mat to an area proximate the wheels.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
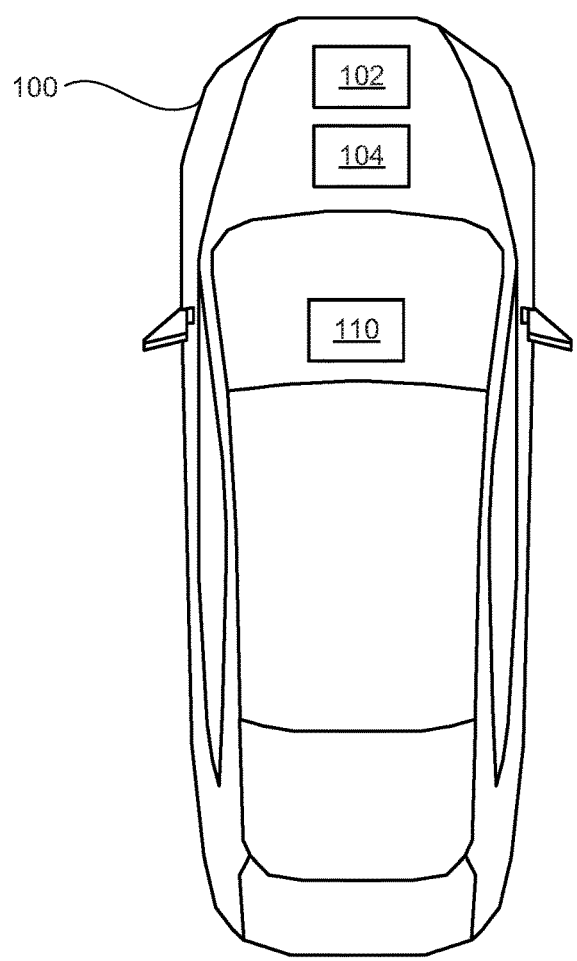
FIG. 1 illustrates an example vehicle according to embodiments of the present disclosure.

While the invention may be embodied in various forms not shown in the drawings, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles may include safety systems in order to provide additional safety for passengers of the vehicle and for those nearby. For instance, vehicles may include airbags, seat belt restrains, crash or collision warning systems, automatic brake systems, anti-lock brake systems, and more.

The effectiveness of these systems may be reduced where there is inclement weather or poor road conditions. For instance, an icy road can prevent a vehicle from stopping or turning to avoid other vehicles or obstacles that may be in the vehicles path. This is in part due to a low coefficient of friction between the wheels of the vehicle and the ground on which the vehicle travels. As a result, the vehicle may lose traction and slide involuntarily and/or in a direction the driver does not intend.

Example systems, devices, and methods disclosed herein may provide added traction to a vehicle that is currently moving (whether under control or sliding) as well as providing added traction to a vehicle that may be stuck, either in snow, ice, or otherwise.

Embodiments may make use of input from the brake ABS system, the vehicle heading, speed, or other characteristic calculated from the vehicle compass or gyroscope, acceleration data from one or more vehicle sensors, a normal road path vector calculated from the navigation map data and/or global positioning system (GPS) data, and information from a road condition sensor that can detect whether the road is icy or otherwise slippery. The systems, devices, and/or method disclosed herein can detect when the vehicle has lost traction, and can responsively deploy aggregate (e.g., sand or other small particles) to the area near one or more wheels. The aggregate may increase traction, allowing the vehicle to stop (if it was previously sliding or moving) or start (if the vehicle was previously stationary).

The sand can be stored in refillable containers at each wheel, with each containing having an electrically actuated dispenser and/or a high volume air flow generator and a broadcast spreader. The container may also include a sensor indicating the aggregate level, so that a driver can be notified when the level gets too low. Alternatively, a single central container with a distribution system to each wheel is also possible.

After the aggregate is deployed, the vehicle traction value may be determined again. If the aggregate has not sufficiently improved the traction, a friction mat may be deployed. The mat may be deployed such that a first end of the mat is directed toward the bottom of the wheel. The mat may provide a higher coefficient of friction between the wheel and the ground, allowing the vehicle to more easily stop or start. After the vehicle is stopped the used portion of the mat may be automatically released from the vehicle so it can be retrieved for disposable, and the system may rest to be prepared for another loss of traction event.

FIG. 1 illustrates an example vehicle 100 according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 includes parts related to mobility, such as a powertrain with an engine, a transmission, a suspension, a driveshaft, and/or wheels, etc. In the illustrated example, vehicle 100 may include one or more electronic components (described below with respect to FIG. 2).

As shown in FIG. 1, vehicle 100 may include an anti-lock brake system (ABS) 102, an inertial sensor 104, and a computing system 110.

ABS 102 may be configured to prevent the wheels from locking up during a braking maneuver. When a driver starts to skid or slide, they may quickly apply pressure to the brakes, which can lead to one or more wheels locking up. The locked wheels may have a lower coefficient of friction than unlocked wheels, due to the nature of static friction being generally higher than kinetic friction.

ABS 102 may include one or more sensors or components configured to detect and relay information to the computing system 110. This information may include various wheel speeds and relative wheel speeds, acceleration or deceleration of the wheels, torque applied to one or more wheels or vehicle shafts, and more.

Inertial sensors 104 may include one or more accelerometers, gyroscopes, timers, RADAR, LIDAR, or other sensors configured to detect information about the vehicle. This information may include the vehicle heading, speed, acceleration, pitch, yaw, tilt, rotation, or other metric with respect to the position and movement (or non-movement) of vehicle 100.

Information from ABS 102 and inertial sensor 104 may be sent to and received by computing system 110. Computing system 110 may be configured to analyze this information to determine whether vehicle 100 has lost traction. This lost traction can be due to the vehicle sliding on ice or snow, or may be due to the wheels spinning in place in snow, mud, or some other material.

Computing system 110 may be configured to determine a vehicle traction value. This value may correspond to whether the vehicle is sliding and/or whether the driver has lost control. The vehicle traction value may be determined by comparing information from ABS 102 and inertial sensor 104. Under typical conditions, the information from both sources should be similar if not identical. Where there is good traction, ABS 102 may indicate the wheel speed, acceleration, and other vehicle characteristics accurately. In addition, inertial sensor 104 may also accurately indicate the vehicle speed, acceleration, and other vehicle characteristics. As such, it is more likely that the information from these sources provide the same or similar information.

Alternatively, if the vehicle is slipping or sliding on ice, for example, the wheel speed indicated by ABS 102 may be different from the speed indicated by the inertial sensors. ABS 102 may indicate that the wheels are stopped (or are spinning in place) while inertial sensor 104 indicated that the vehicle is still moving (or not moving at all). This mismatch in wheel speeds may indicate that the wheels have lost traction. Alternatively or in addition, wheel direction, vehicle direction, acceleration, and many other wheel or vehicle characteristics can be used to determine a loss of traction.

In some cases, computing system 110 may use a first threshold vehicle traction value to determine that traction has been lost. For instance, under ordinary operation of the vehicle in ideal conditions such as good weather, good road, etc., the traction value may range from 90-100 percent. The value may fluctuate due to imperfections in the sensors, bumps in the road, or other factors. When the vehicle begins to slide on ice, the vehicle traction value may drop to 50% or lower. The first threshold may be set at 50%.

In response to determining that the vehicle traction value is below the first threshold, computing system 110 may deploy aggregate to an area proximate the wheels. This is shown in further detail in FIG. 3A. The aggregate may include sand or other particles that can be used to increase traction, to allow the vehicle to either stop safely when it is sliding, or to start moving when it is stuck.

If the traction does not improve after deploying the aggregate, computing device 110 may then deploy a friction mat to one or more wheels to increase traction. This is described in more detail below with respect to FIG. 3B. Computing device 110 may determine whether or not to deploy the friction mat(s) based on comparison of the vehicle traction value to a second threshold. The second threshold may be higher than the first threshold, such as 75% for example. After the aggregate is deployed, computing device 110 may start a timer or may wait for a predetermined period of time. If the traction value has not increased sufficiently after that time period, one or more friction mats may be deployed.

In some cases, the second threshold may be higher than the first threshold. In practice the higher second threshold may only be operative after the first threshold has been reached. For instance, the first threshold may be 50% and the second threshold may be 80%. Where the traction value initially is between 90-100%, and falls to 75%, the friction mat may not be deployed. However if the traction value falls to 0% (i.e., the wheels are locked and the vehicle continues to move), aggregate may be deployed. After the aggregate is deployed, the traction value may increase to 70%. But since the traction value is still below the second threshold (in this example, 80%), the friction mat is deployed to increase friction between the wheels and the ground. Alternatively, if the traction value increases to 85% after deploying the aggregate, the friction mat may not be deployed.

In some instance, the second threshold may correspond to the first threshold such that the second threshold is some predetermined amount higher than the first threshold. For instance, after deploying the aggregate, computing system 110 may determine that the traction value has increased by a certain amount (e.g., 20%) or else the friction mat is deployed. Or the second threshold may include a multiplier (or other mathematical function) with respect to the first threshold, such that computing device 110 determines that the traction value has increased by some function with respect to the initial traction value prior to deploying aggregate.

In some examples, computing device 110 may be configured to determine a first movement characteristic of vehicle 100 based on data received from ABS 102, and determine a second movement characteristic of vehicle 100 based on data received from inertial sensor 104. The movement characteristics (such as speed, acceleration, heading, etc.) may be the same or may be different. Computing device 110 may then determine the first and second thresholds based on the determined first and second movement characteristics.

Figure 2:
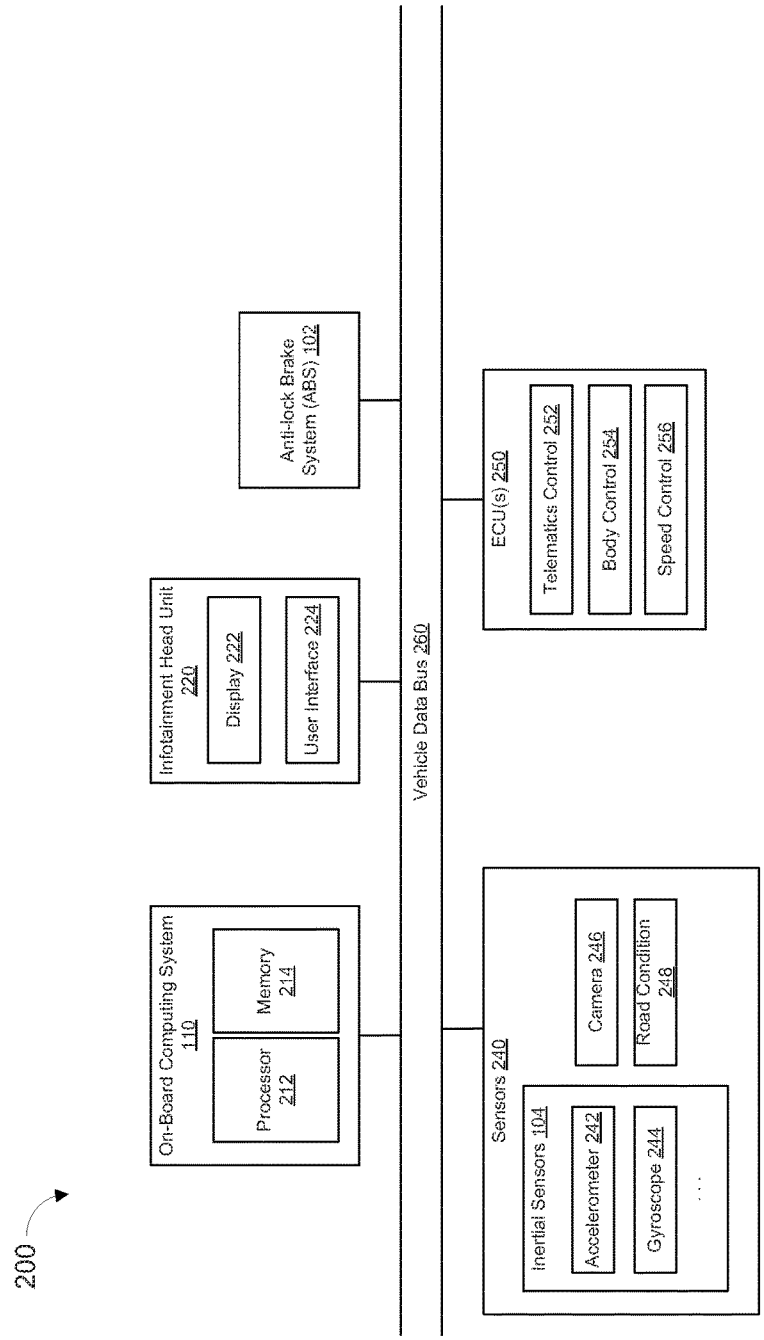
FIG. 2 illustrates an example block diagram of components of the vehicle of FIG. 1.

FIG. 2 illustrates an example block diagram 200 showing electronic components of vehicle 100, according to some embodiments. In the illustrated example, the electronic components 200 include an on-board computing system 110, infotainment head unit 220, anti-lock brake system 102, sensors 240, electronic control unit(s) 250, and vehicle data bus 260.

The on-board computing system 110 may include a microcontroller unit, controller or processor 212 and memory 214. The processor 212 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 214 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 214 includes multiple kinds of memory, particularly volatile memory and non-volatile memory.

The memory 214 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 214, the computer readable medium, and/or within the processor 212 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 220 may provide an interface between vehicle 100 and a user. The infotainment head unit 220 may include one or more input and/or output devices, such as display 222, and user interface 224, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 220 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 220 may share a processor and/or memory with on-board computing system 110. Additionally, the infotainment head unit 220 may display the infotainment system on, for example, a center console display of vehicle 100.

In some examples, information related to the ABS data, inertial sensors data, determined vehicle traction values, deployment of aggregate, and deployment of friction mat(s) may be displayed to a user under various circumstances.

Sensors 240 may include one or more sensors under the category of "inertial sensors 104." For instance, sensors 240 may include one or more accelerometers 242, gyroscopes 244, timers, RADAR, LIDAR, or other sensors, in addition to one or more cameras 246 and road condition sensors 248. The road condition sensor in particular may determine whether ice, snow, or other non-ideal road conditions are present. This information may be used by computing system 110 to determine the first and/or second threshold, and to determine whether and when to deploy aggregate and/or one friction mats.

The ECUs 250 may monitor and control subsystems of vehicle 100. ECUs 250 may communicate and exchange information via vehicle data bus 260. In some examples, one or more sensors 240, the ABS 102, and one or more other devices or systems may be included in or comprise part of one or more of ECUs 250. Additionally, ECUs 250 may communicate properties (such as, status of the ECU 250, sensor readings, control state, error and diagnostic codes, etc.) to and/or receive requests from other ECUs 250. Some vehicles 100 may have seventy or more ECUs 250 located in various locations around the vehicle 100 communicatively coupled by vehicle data bus 260. ECUs 250 may be discrete sets of electronics that include their own circuit(s) (such as integrated circuits, microprocessors, memory, storage, etc.) and firmware, sensors, actuators, and/or mounting hardware. In the illustrated example, ECUs 250 may include the telematics control unit 252, the body control unit 254, and the speed control unit 256.

The telematics control unit 252 may control tracking of the vehicle 100, for example, using data received by a GPS receiver, communication module, and/or one or more sensors 240. The body control unit 254 may control various subsystems of the vehicle 100. For example, the body control unit 254 may control power a trunk latch, windows, power locks, power moon roof control, an immobilizer system, and/or power mirrors, etc. The speed control unit 256 may transmit and receive one or more signals via data bus 260, and may responsively control a speed, acceleration, or other aspect of vehicle 100.

Vehicle data bus 260 may include one or more data buses that communicatively couple the on-board computing system 110, infotainment head unit 220, ABS 102, sensors 240, ECUs 250, and other devices or systems connected to the vehicle data bus 260. In some examples, vehicle data bus 260 may be implemented in accordance with the controller area network (CAN) bus protocol as defined by International Standards Organization (ISO) 11898-1. Alternatively, in some examples, vehicle data bus 250 may be a Media Oriented Systems Transport (MOST) bus, or a CAN flexible data (CAN-FD) bus (ISO 11898-7).

Figure 3A:
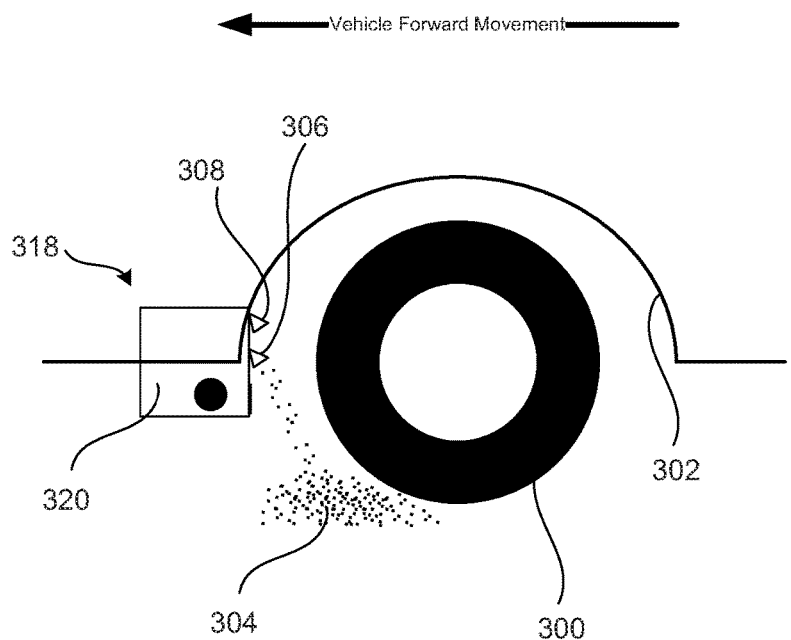
FIGS. 3A and 3B illustrate side perspective views of an example vehicle traction system according to embodiments of the present disclosure.
Figure 3B:
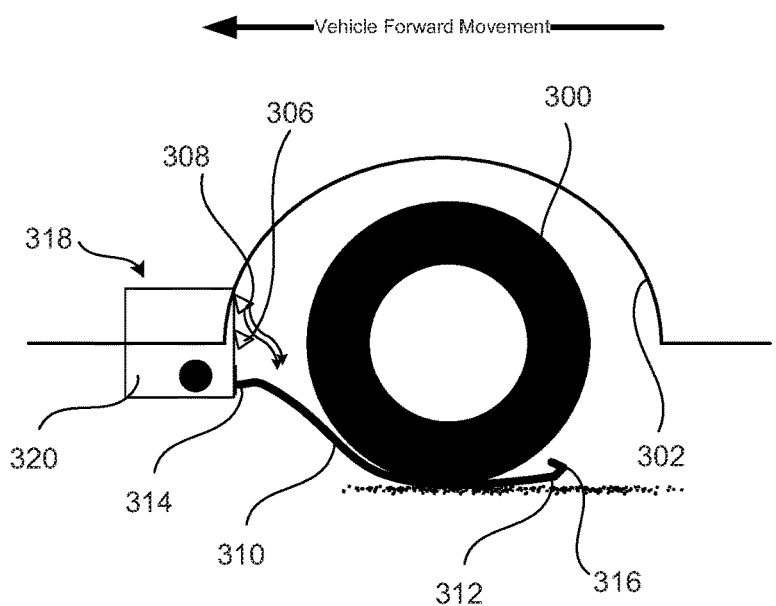

FIGS. 3A and 3B illustrate side views of an example vehicle traction system according to embodiments of the present disclosure. FIG. 3 A shows a wheel 300 positioned within a vehicle wheel well 302. The vehicle traction system 318 may be positioned on a forward side of the wheel well (i.e., toward the front of the vehicle). Vehicle traction system 318 may be configured to emit aggregate 304 through a nozzle 306 onto an area proximate the wheel 300. This aggregate may increase the coefficient of friction between the wheel and the ground, thereby increasing traction.

FIG. 3A illustrates a first step, in which the vehicle traction value has fallen below the first threshold. In response, the vehicle traction system 318 deploys aggregate 304 to the ground. Deploying the aggregate may include actuating a switch or level to allow the aggregate to be dispensed out of the vehicle traction system 318. In some cases, the aggregate may be dispensed using the force of gravity. Further, vehicle traction system 318 may include one or more arms, levers, or other members configured to push aggregate 304 out of the refillable container and onto the ground. Compressed air (such as from nozzle 308 or from another source) may also be used to disperse the aggregate onto the ground and/or the tire tread moving towards the ground After the aggregate 304 is deployed, and after a period of time has elapsed, the vehicle traction value may again be determined. The period of time may be inserted to allow the aggregate to be dispersed properly, and to take effect in increasing traction. If the traction value after aggregate deployment and after the period of time has elapsed is not sufficiently high (i.e., below the second threshold), then the friction mat may be deployed as shown in FIG. 3B.

FIG. 3B illustrates the deployment of a friction mat 310. The friction mat deployment device 320 may include a spool or storage bin onto which the friction mat is gathered. When it is determined to deploy the friction mat, the spool or storage bin may unwind (via a motor, lever, or other component), causing a first end 312 of friction mat 310 to be directed out of the vehicle traction system 318 and drawn under wheel 300. In some examples, the friction mat may not be drawn completely under wheel 300, but may instead bunch up or be caught on the front side of wheel 300.

In some examples, the friction mat deployment device 320 may include an air nozzle 308 configured to discharge compressed air onto the friction mat 310, which may be gathered on a spool or storage bin of deployment device 320. The compressed air may direct friction mat 10 downward and onto the ground near wheel 300.

A second end 314 of friction mat 310 may be retained by deployment device 320, which may be mounted to the vehicle body. This may prevent the friction mat 310 from being completely drawn under and/or around wheel 300. It may also ensure that the mat remains underneath wheel 300 during movement of the vehicle. Further, by retaining the second end 314 attached to the vehicle body (via the deployment device 320), the friction mat is less likely to be drawn into the wheel axle or other part of the vehicle that may cause damage.

In some examples, friction mat 310 may include a flap 316 configured to catch the compressed air stream coming from nozzle 308. This may aid in directing the friction mat 310 toward the ground and underneath wheel 300. The compressed air stream from nozzle 308 may also be used or assist in dispersing aggregate 304.

When the friction mat is deployed, the coefficient of friction between the wheel 300 and the ground may increase. This may correspond to an increase in the vehicle traction value. Once the computing system determines that the vehicle has come to rest or is stationary after deployment of the friction mat, the deployment device 320 may responsively release the second end 314 of friction mat 310. This may allow the friction mat to be collected for disposal. The deployment device may also include a plurality of friction mats gathered onto the spool or storage bin, such that when one is released a next friction mat is prepared for use. In this manner, the system can be used multiple times without the need to replace any parts.

FIGS. 3A and 3B illustrate one embodiment of the traction system 318 in which it is positioned on a forward side of the wheel well 302 in line with wheel 300. However it should be understood that other placements are possible as well, such as on the rear side of the wheel well in line with the wheel, or on an inside or outside part of the vehicle in line with the axle of wheel 300.

Figure 4:
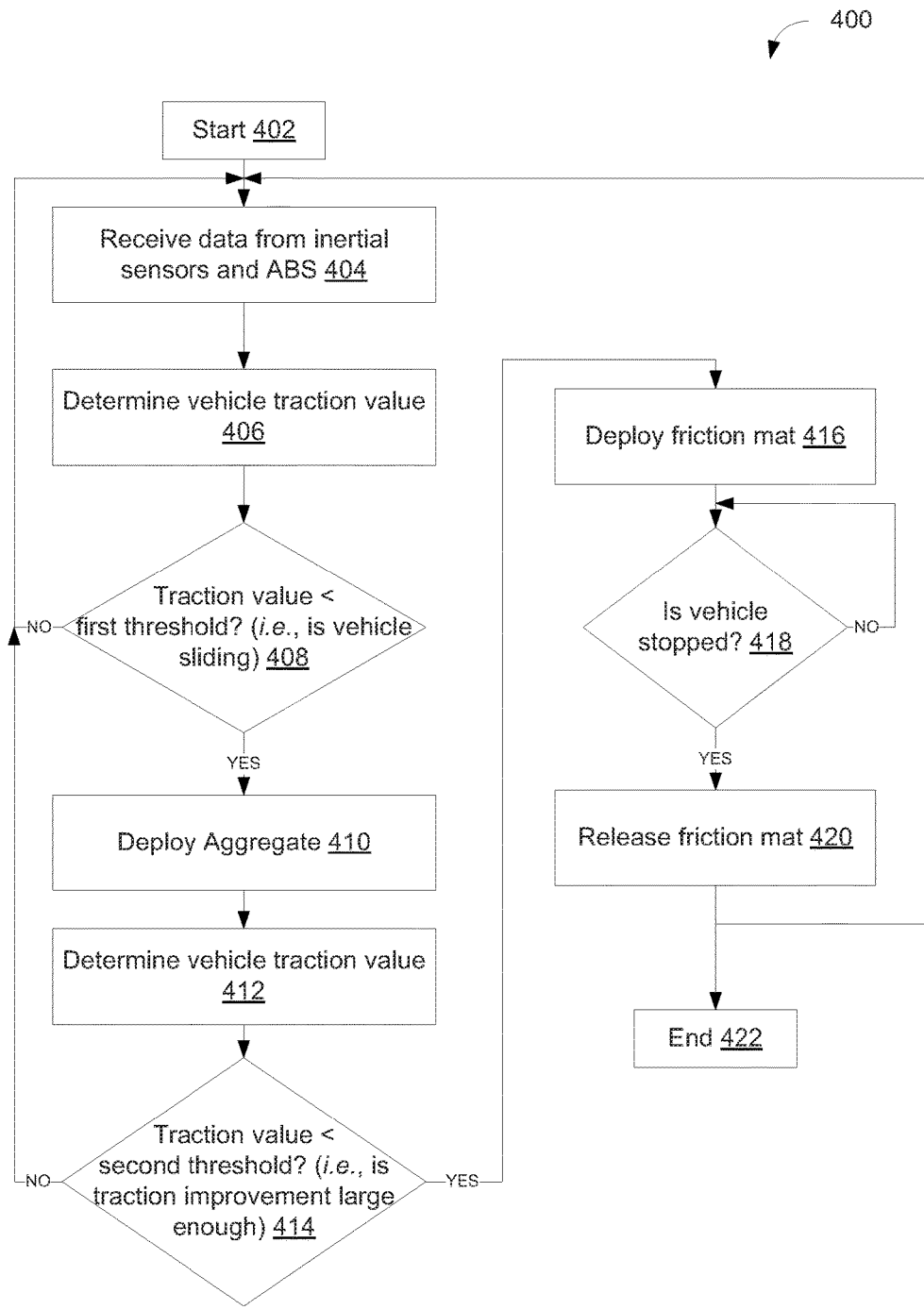
FIG. 4 illustrates a flowchart of an example method according to embodiments of the present disclosure.

FIG. 4 illustrates a flowchart of an example method 400 according to embodiments of the present disclosure. Method 400 may provide improved safety for a vehicle. The flowchart of FIG. 4 is representative of machine readable instructions that are stored in memory (such as memory 214) and may include one or more programs which, when executed by a processor (such as processor 212) may cause vehicle 100 and/or one or more systems or devices to carry out one or more functions described herein. While the example program is described with reference to the flowchart illustrated in FIG. 4, many other methods for carrying out the functions described herein may alternatively be used. For example, the order of execution of the blocks may be rearranged or performed in series or parallel with each other, blocks may be changed, eliminated, and/or combined to perform method 400. Further, because method 400 is disclosed in connection with the components of FIGS. 1-3, some functions of those components will not be described in detail below.

Method 400 may start at block 402. At block 404, method 400 may include receiving data from inertial sensors and/or ABS. As noted above, this data may include accelerometer, gyroscope, or other sensor data corresponding to one or more movement characteristics of the vehicle. For instance, this may include speed, heading, acceleration, or more.

At block 406, method 400 may include determining a vehicle traction value. The vehicle traction value may indicate a percentage or other metric corresponding to how much control the user has over the vehicle. Where the road conditions include snow, ice, rain, or other factors, the vehicle traction value may be lower.

At block 408, method 400 may include determining whether the vehicle traction value is below a first threshold. If the vehicle traction value remains high and is above the first threshold, method 400 may include reverting back to block 404 to receive additional data.

But if the vehicle traction value is below the first threshold, that may indicate that the vehicle is sliding or that the wheels have lost traction with the road. In this case, method 400 may include deploying aggregate at block 410. Method 400 may then include determining the vehicle traction value at block 412, after deploying the aggregate. Method 400 may also include waiting a predetermined period of time after deploying the aggregate before determining the vehicle traction value at block 412. This may provide a delay to allow the aggregate to be deployed properly and to take effect to increase the traction value.

At block 414, method 400 may include determining whether the vehicle traction value determined at block 412 is less than a second threshold. This may in effect be a determination whether the increase in traction caused by the aggregate is large enough. If there is a large increase in traction (such that the vehicle traction value is above the second threshold), then method 400 may revert back to block 404 to receive additional data.

But if the increase in traction is not great enough, or if there is no increase at all, the vehicle traction value will remain below the second threshold. In this case, method 400 may include deploying a friction mat at block 416. Each wheel may include a deployment device configured to deploy a mat specific to each wheel. In some cases, one or more wheels may lose traction while one or more other wheels may not. Or one or more wheels may increase traction above the second threshold, while one or more other wheels do not. In this case, some examples may include deploying a friction mat to only the wheel or wheels that have lost friction ad remain below the second threshold.

Block 418 of method 400 may include determining whether the vehicle has stopped moving. If the vehicle has not stopped, method 400 may continue with block 418, waiting until motion has stopped. Once motion has stopped, method 400 may include releasing the friction mat at block 420. This may include cutting the friction mat, or decoupling the friction mat from the deployment device. Method 400 may then revert back to block 404 to receive additional data. Method 400 may then end at block 422.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   wheels;
   an anti-lock brake system comprising a deployment device positioned proximate to one of the wheels, the deployment device storing aggregate and a friction mat and configured to:
   deploy the aggregate; and
   deploy the friction mat;
   inertial sensor; and
   a computing system configured to:
   cause the deployment device to deploy the aggregate to an area proximate the one of the wheels, responsive to determining that a vehicle traction value is below a first threshold; and
   cause the deployment device to, after deploying the aggregate, deploy the friction mat to the area, responsive to determining that the vehicle traction value remains below a second threshold.

2. The vehicle of claim 1, wherein the vehicle traction value is determined based on data received from the anti-lock brake system and the inertial sensor.

3. The vehicle of claim 2, wherein the data received from the anti-lock brake system and the inertial sensor comprises a vehicle speed, heading, and acceleration.

4. The vehicle of claim 1, wherein the computing system is further configured to:
   determine a first movement characteristic of the vehicle based on data received from the anti-lock brake system;
   determine a second movement characteristic of the vehicle based on data received from the inertial sensor; and
   determine the first and second threshold based on the first and second movement characteristics.

5. The vehicle of claim 1, further comprising a road condition sensor configured to determine whether ice is present on the road, wherein the computing system is further configured to cause the deployment device to deploy the aggregate and the friction mat responsive to determining that ice is present on the road.

6. The vehicle of claim 1, wherein the second threshold is greater than the first threshold.

7. The vehicle of claim 1, wherein the computing device is further configured to:
   determine a first vehicle traction value before deploying the aggregate;
   determine a second vehicle traction value after deploying the aggregate;
   determine that the second vehicle traction value has increased by less than a predefined amount compared to the first vehicle traction value; and
   responsively cause the deployment device to deploy the friction mat.

8. The vehicle of claim 1, wherein the deployment device is configured to deploy the friction mat by:
   directing a first end of the friction mat underneath a wheel of the vehicle; and
   retaining a second end of the friction mat.

9. The vehicle of claim 8, wherein the computing device is further configured to:
   determine that the vehicle is stationary after causing the deployment device to deploy the friction mat; and
   responsively cause the deployment device to release second end of the friction mat.

10. The vehicle of claim 1, wherein the deployment device is positioned on a forward facing side of a wheel well corresponding to the one of the wheels, wherein the friction mat is gathered onto a spool, and wherein the deployment device is configured to:
    discharge compressed air onto the spool, such that a first end of the friction mat is directed under the wheel; and
    retain a second end of the friction mat opposite the first end on the spool.

11. A method comprising:
    determining, by an inertial sensor of a vehicle, that a vehicle traction value is below a first threshold, the vehicle comprising a deployment device proximate to one of wheels of the vehicle, the deployment device storing aggregate and a friction mat;
    responsively causing a deployment device to deploy aggregate to an area proximate the one of the wheels; and
    after deploying the aggregate, causing the deployment device to deploy the friction mat to the area, responsive to determining that the vehicle traction value remains below a second threshold.

12. The method of claim 11, wherein the vehicle traction value is determined based on data received from the anti-lock brake system and the inertial sensor.

13. The method of claim 12, wherein the data received from the anti-lock brake system and the inertial sensor comprises a vehicle speed, heading, and acceleration.

14. The method of claim 11, further comprising:
determining a first movement characteristic of the vehicle based on data received from the anti-lock brake system;
determining a second movement characteristic of the vehicle based on data received from the inertial sensor; and
determining the first and second threshold based on the first and second movement characteristics.

15. The method of claim 11, wherein the vehicle further comprises a road condition sensor, the method further comprising:
determining, by the road condition sensor, whether ice is present on the road; and
causing the deployment device to deploy the aggregate and the friction mat responsive to determining that ice is present on the road.

16. The method of claim 11, wherein the second threshold is greater than the first threshold.

17. The method of claim 11, further comprising:
determining a first vehicle traction value before deploying the aggregate;
determining a second vehicle traction value after deploying the aggregate;
determining that the second vehicle traction value has increased by less than a predefined amount compared to the first vehicle traction value; and
responsively causing the deployment device to deploy the friction mat.

18. The method of claim 11, wherein deploying the friction mat further comprises:
directing a first end of the friction mat underneath the one of the wheels; and
retaining a second end of the friction mat to the deployment device.

19. The method of claim 18, further comprising:
determining that the vehicle is stationary after deploying the friction mat; and
responsively causing the deployment device to release the second end.

20. The method of claim 11, wherein the deployment device is positioned on a forward facing side of a wheel well corresponding to the one of the wheels, and wherein the friction mat is gathered onto a spool, the method further comprising:
discharging compressed air onto the spool, such that a first end of the friction mat is directed under the one of the wheels; and
retaining a second end of the friction mat opposite the first end on the spool.

* * * * *